Patented Oct. 18, 1938

2,133,591

UNITED STATES PATENT OFFICE 2,133,591

PROCESS FOR THE PRODUCTION OF ZEIN

Lloyd C. Swallen, Pekin, Ill., assignor, by mesne assignments, to Corn Products Refining Company, New York, N. Y., a corporation of New Jersey No Drawing. Application May 8, 1935, Serial No. 20,402
Renewed January 3, 1938

6 Claims. (Cl. 87—28)

My invention relates to an improved process for obtaining concentrated solutions of zein from the mixed proteins of maize. More specifically, my invention relates to a process for obtaining zein in concentrated solution having reduced oil and color content and unaltered plasticity.

It has long been known that zein could be extracted from maize meal or from mixed maize proteins such as gluten meal by extraction with aqueous alcoholic solvents. Various processes for concentrating and purifying the resulting extracts have also been known. The processes used in the past, however, have been designed primarily for laboratory preparations and I have found that such processes are not suitable for producing purified zein for use in the preparation of plastics. For this purpose the physical nature of the product is extremely important, in addition to its chemical properties or its adhesive properties. It is necessary that the material be in a form which is adapted to plastic flow at suitable temperatures in the presence of curing agents such as formaldehyde. I have found that the prior processes have either altered the plasticity of the zein to an undesirable extent or have involved the treatment of such dilute solutions as to render the process impractical from a commercial standpoint.

I have now discovered a process which obviates all of these prior difficulties. According to my present invention, the zein is progressively concentrated in each step of the process with consequent minimized handling costs and minimized solvent losses. Also, the zein is maintained in solution throughout the entire process so that its plasticity is not impaired by changes in state such as precipitation or gelling. My process comprises, briefly, extracting the proteinaceous material with an aqueous alcoholic solvent mixture of low water content, concentrating the resulting extract, and treating the concentrated extract with an alcohol-miscible organic solvent for oil and coloring matter which is a non-solvent for zein, whereby the zein is separated in an alcoholic solution of increased concentration and oil and coloring matter are removed.

The extraction step is effected by means of an aqueous alcoholic solvent containing about 5–10% or more water and preferably 7–8%. A concentration of water up to 20% or more may be employed if the zein tolerance of the particular solution is not exceeded. The solvent may comprise pure aqueous ethyl alcohol or other suitable solvents such as methyl alcohol or mixtures of alcohols with other organic solvents. The extraction step may be carried out according to any known procedure, but if the zein is to be used for plastic purposes, I prefer to employ the process disclosed in my copending application Ser. No. 20,401, filed May 8, 1935. According to this process, the extraction is effected at temperatures below 70° C. and preferably from 55–65° C., and at hydrogen ion concentrations such that the pH of the final extract is above 6.0 and preferably falls within the range 6.0—7.0. Any suitable apparatus may be employed, as for example, a percolator, and the process may be carried out either by the batch method, the countercurrent method, or a combination of these two.

The extract obtained in the first step of the process is next subjected to concentration in order to minimize the volumes handled in later stages of the process and to facilitate the subsequent extraction step. The concentration may be effected by any means suitable for handling protein solutions, but I prefer simply to subject the solution to vacuum distillation. The degree of concentration to be secured in this step of the process will depend to some extent upon the water content of the original extraction medium. Increased water content increases the danger of precipitation in this step, but a safe limit of concentration can readily be determined by a simple preliminary experiment. If the preferred water content of 7–8% in the original extraction medium is employed, I have found that the solution may then be concentrated to any extent compatible with subsequent mechanical handling. For example, after concentration to 30% zein content, in which case the percentage of water in the solvent mixture may be as high as 20% the material will be found to have a consistency of thick molasses. This may be handled satisfactorily in most apparatus and constitutes a desirable degree of concentration from the standpoint of efficient solvent recovery.

The concentrated solution obtained as described above is next subjected to treatment with a solvent for maize oil and coloring matter, which is at least partially miscible with alcohol, and which is a non-solvent for zein. I have found that toluol is quite satisfactory for this purpose, although various other materials may be employed. Other aromatic hydrocarbons such as benzol and xylol may be used, and chlorinated hydrocarbons such as carbon tetrachloride will also be found to be satisfactory. Aliphatic hydrocarbons such as petroleum ether and the like may be employed, but these are somewhat deficient in miscibility with ethyl alcohol, when such is the zein solvent used, as well as in solvent power for coloring matter, and will usually necessitate an increased number of extractions. The solvent employed is added directly to the concentrated zein solution and the mixture is thoroughly agitated and then allowed to settle. The mixture will be found to separate into two layers, the one comprising an alcoholic zein solution, and the other a solvent layer containing a portion of the alcohol and a substantial amount of the oil and coloring matter of the original solution. These layers may readily be separated by the use of a siphon or simply by decanting the upper layer. Depending upon the nature of the oil solvent and the relative amount employed it will be possible to regulate within certain limits the concentration of zein in the alcohol layer. Using pure toluol as the oil solvent, in an amount sufficient to remove the bulk of the oil and coloring matter, the concentration of zein in the alcohol layer will be substantially increased. Further concentration of zein and further extraction of oil and coloring matter may be obtained by repeating this process.

The amount of solvent utilized for each extraction is not critical so long as it is sufficient to effect a complete separation of the two layers and is insufficient to precipitate the zein in dough-like form. When employing pure aqueous alcohol in the first extraction step of my process, I find that the addition of a volume of toluol or other color solvent equal to the volume of the concentrated alcoholic zein solution is quite satisfactory. The optimum amount for each extraction and the optimum number of color extractions to be made will, of course, depend upon economic considerations and upon the desired purity of the product. For commercial operation it would be desirable to modify the extraction process to utilize secondary extracts from previous batches as initial extracting media for new material, or to utilize a strictly countercurrent system.

After the final extraction with the color solvent and the separation of the solvent layer, the zein is obtained in a concentrated solution suitable for treatment to obtain the zein in a solid state. The material will be found to have unaltered plasticity and to have an oil and color content sufficiently reduced to be suitable for use in the preparation of plastics. If the intermediate concentration step is carried to a concentration of 30% zein or higher, the final solution, after treatment with the color solvent, will be found to be in the form of a thick paste suitable for treatment in any known manner to recover the solid zein. It may thus be seen that my process secures the ultimate concentration of zein while still maintaining the material in solution and preventing reduction of its plasticity. This is accomplished in a minimum number of operations which serve at the same time to purify the material and reduce its oil and color content. These advantages are outstanding from the standpoint of a commercially feasible process for obtaining a protein in a suitable physical form for use in plastic production.

My invention may further be illustrated by the following specific example: 100 lbs. of gluten meal ground to pass an 8 mesh screen but not a 20 mesh screen was mixed with 35 gallons of hot 93% ethyl alcohol in a suitable vessel and gently agitated for a period of 2 hours. The temperature after first mixing was approximately 60° C. The alcohol solution contained 2 liters of 6.5 N sodium hydroxide, giving an initial pH of 8.0 and a final pH of approximately 6.5. After the 2 hour extraction period, the alcoholic extract was decanted from the meal and distilled under vacuum at 35–40° C. vapor temperature for a period of approximately 2 hours, thus reducing the volume to approximately 9 gallons. The concentrated extract was then stirred with 13 gallons of toluol and, after allowing it to settle, the supernatant solvent layer was decanted. Four additional extractions with equal volumes of toluol were then made, and after the final separation, the zein was obtained in an alcoholic solution having the consistency of a thick paste. After recovery in solid form the zein was found to have unaltered plasticity and to have a satisfactory light-color and low oil content. When made into a plastic, the resulting product was found to be a clear light-colored hard material having satisfactory toughness and elasticity and a transverse strength of 11,500 lbs. per sq. inch.

It will be understood, of course, that in commercial operation of the process of the above example the original zein extraction would be followed by additional extractions, or washes, and the wash solutions would be utilized for preliminary extractions of subsequent batches. Likewise, the zein extraction and also the subsequent color extraction could be carried out according to strictly countercurrent methods. This example is illustrative only and is not to be construed as limiting the scope of my invention. In general, it may be said that any equivalents or any modifications of procedure which would naturally occur to one skilled in the art may be employed without departing from the scope of my invention.

My invention now having been described, what I claim is:

1. Process of removing oil and color from an aqueous alcohol solution of zein which comprises treating said solution with a volatile aromatic hydrocarbon solvent for maize-oil and coloring matter, in such quantity that the material is separated into two liquid layers, the lower containing zein, its solvent and some of the oil solvent, the upper layer containing oil, coloring matter and zein and oil solvents; and separating said layers one from the other.

2. Process of removing oil and color from an aqueous alcoholic solution of zein containing at least 5% of water which comprises: treating said solution with a volatile aromatic hydrocarbon solvent for maize-oil and coloring matter in such quantity that the material is separated into two liquid layers, the lower containing zein, alcohol and some of the oil solvent, the upper layer containing oil, coloring matter, alcohol and oil solvent; and separating said layers one from the other.

3. Process of removing oil and color from an aqueous alcoholic solution of zein containing between 5% and 20% of water which comprises: treating said solution with a volatile aromatic hydrocarbon solvent for maize-oil and coloring matter in such quantity that the material is separated into two liquid layers, the lower containing zein, alcohol and some of the oil solvent, the upper layer containing oil, coloring matter, alcohol and oil solvent; and separating said layers one from the other.

4. Process of removing oil and color from an aqueous alcohol solution of zein which comprises:

treating the solution with toluol to dissolve the maize-oil and coloring matter in such quantity that the material is separated into two liquid layers, the lower containing zein, its solvent and some toluol, the upper layer containing oil, coloring matter, some of the zein solvent and toluol; and separating said layers one from the other.

5. Process of removing oil and color from an aqueous alcohol solution of zein which comprises: treating the solution with benzol to dissolve the maize-oil and coloring matter in such quantity that the material is separated into two liquid layers, the lower containing zein, its solvent and some benzol, the upper layer containing oil, coloring matter, some of the zein solvent and benzol; and separating said layers one from the other.

6. Process of removing oil and color from an alcoholic solution of zein which comprises treating said solution with a solvent for maize-oil and coloring matter, which is at least partially miscible with alcohol, and is a non-solvent for zein, in such quantity that the material is separated into two liquid layers, the lower containing zein, its solvent, and some of the oil solvent, and the upper layer containing oil, coloring matter and zein and oil; and separating said layers one from the other.

LLOYD C. SWALLEN.